United States Patent
Ueno et al.

(10) Patent No.: US 11,186,698 B2
(45) Date of Patent: *Nov. 30, 2021

(54) RUBBER COMPOSITION

(71) Applicant: ZEON CORPORATION, Tokyo (JP)

(72) Inventors: Masahiro Ueno, Tokyo (JP); Yoshihisa Takeyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/643,844

(22) PCT Filed: Aug. 29, 2018

(86) PCT No.: PCT/JP2018/031988
§ 371 (c)(1),
(2) Date: Mar. 3, 2020

(87) PCT Pub. No.: WO2019/058911
PCT Pub. Date: Mar. 28, 2019

(65) Prior Publication Data
US 2020/0255622 A1      Aug. 13, 2020

(30) Foreign Application Priority Data
Sep. 22, 2017   (JP) .............................. JP2017-182849

(51) Int. Cl.
*C08K 3/36*     (2006.01)
*C08K 3/04*     (2006.01)

(52) U.S. Cl.
CPC ................ *C08K 3/041* (2017.05); *C08K 3/36* (2013.01)

(58) Field of Classification Search
None
See application file for complete search history.

(56) References Cited

U.S. PATENT DOCUMENTS 10,982,083 B2 *   4/2021   Takeyama ............ C08K 5/0025
2008/0318049 A1   12/2008  Hata et al.
2014/0154454 A1    6/2014  Ueki et al.

FOREIGN PATENT DOCUMENTS

| JP | 2014109020 A | 6/2014 |
| JP | 2016108476 A | 6/2016 |
| JP | 2017082145 A | 5/2017 |
| WO | 2006011655 A1 | 2/2006 |

OTHER PUBLICATIONS

Mar. 24, 2020, International Preliminary Report on Patentability issued in the International Patent Application No. PCT/JP2018/031988.
Oct. 23, 2018, International Search Report issued in the International Patent Application No. PCT/JP2018/031988.

* cited by examiner

*Primary Examiner* — Edward J Cain
(74) *Attorney, Agent, or Firm* — Kenja IP Law PC

(57) ABSTRACT

Disclosed is a rubber composition which comprises a rubber, fibrous carbon nanostructures and a filler, wherein, in a state where the filler is dispersed in the rubber composition, the filler is mainly present as aggregates each formed of a plurality of primary particles aggregated with each other, and the aggregates have an average maximum diameter of 100 nm or more and 1,000 nm or less.

8 Claims, No Drawings

RUBBER COMPOSITION

TECHNICAL FIELD

The present disclosure relates to rubber compositions, and more particularly to rubber compositions which comprise a rubber, fibrous carbon nanostructures, and a filler.

BACKGROUND

As materials with excellent electrical conductivity, thermal conductivity and other properties, composite materials have been used which are obtained by blending polymer materials such as rubbers with carbon materials. In recent years, attention has been paid on fibrous carbon materials, in particular on fibrous carbon nanostructures such as carbon nanotubes (hereinafter sometimes referred to as "CNTs") as carbon materials whose electrical conductivity and thermal conductivity can be improved highly efficiently.

Also, fillers in particulate or powder form have been blended into compositions of polymer materials such as rubbers for the purposes of reinforcement, providing functionality, reducing costs, etc. For example, PTL 1 discloses a fluororubber which comprises carbon nanotubes and high structure carbon black.

CITATION LIST

Patent Literature

PTL 1 JP2016108476A 1

SUMMARY

Technical Problem

However, in rubber compositions containing fibrous carbon nanostructures such as CNTs and a filler, characteristics such as tensile strength and tensile elongation may not necessarily be satisfactory depending on the dispersed condition of the filler in the rubber composition.

An object of the present disclosure is therefore to provide a rubber composition which contains fibrous carbon nanostructures and a filler and is excellent in tensile strength and tensile elongation.

Solution to Problem

The inventors conducted extensive studies to achieve the above-mentioned object and established that a rubber composition excellent in tensile strength and tensile elongation can be obtained by controlling the average maximum diameter of filler aggregates dispersed in the rubber composition to fall within a specific range. The present disclosure has thus been completed.

That is, the present disclosure advantageously solves the above-mentioned problem, and the disclosed rubber composition comprises a rubber, fibrous carbon nanostructures and a filler, wherein, in a state where the filler is dispersed in the rubber composition, the filler is mainly present as aggregates each formed of a plurality of primary particles aggregated with each other, and the average maximum diameter of the aggregates is 100 nm or more and 1,000 nm or less. In a rubber composition containing fibrous carbon nanostructures and a filler, by dispersing the filler mainly as aggregates and setting the average maximum diameter of the aggregates to 100 nm or more and 1,000 nm or less, it is possible to provide the rubber composition with excellent tensile strength and tensile elongation.

In the present disclosure, the "average maximum diameter of aggregates" of a filler can be obtained by measuring the maximum diameter of each of 10 or more arbitrarily selected filler aggregates on a transmission electron microscope (TEM) image and calculating the numerical average.

The rubber composition of present disclosure preferably comprises the fibrous carbon nanostructures in an amount of 0.1 parts by volume or more and 10 parts by volume or less per 100 parts by volume of the rubber. When the fibrous carbon nanostructures content falls within the above range, it is possible to form a rubber composition excellent in physical properties such as electrical conductivity.

The rubber composition of present disclosure preferably comprises the filler in an amount of 1 part by volume or more and 100 parts by volume or less per 100 parts by volume of the rubber. When the filler content falls within the above range, a reinforcing effect in the rubber composition can be sufficiently exhibited.

In the rubber composition of the present disclosure, the fibrous carbon nanostructures preferably comprise single-walled carbon nanotubes. When the fibrous carbon nanostructures comprise single-walled carbon nanotubes, the physical properties of the rubber composition can be improved with small amounts of the fibrous carbon nanostructures.

In the rubber composition of the present disclosure, the fibrous carbon nanostructures preferably exhibit a convex upward shape in a t-plot obtained from an adsorption isotherm. When fibrous carbon nanostructures whose t-plot exhibits a convex upward shape are used, the physical properties of the rubber composition can be further improved with small amounts of the fibrous carbon nanostructures added.

The t-plot preferably has a bending point in a range of $0.2 \leq t \, (nm) \leq 1.5$. When fibrous carbon nanostructures whose bending point of the t-plot falls within the range of $0.2 \leq t \, (nm) \leq 1.5$ are used, the physical properties of the rubber composition can be further improved with small amounts of the fibrous carbon nanostructures added.

Total specific surface area S1 and internal specific surface area S2 which are obtained from the t-plot preferably satisfy the condition $0.05 \leq S2/S1 \leq 0.30$. When the value of S2/S1 of the fibrous carbon nanostructures falls within the above range, the physical properties of the rubber composition can be further improved with small amounts of the fibrous carbon nanostructures added.

In the rubber composition of the present disclosure, the filler preferably comprises at least one member selected from the group consisting of carbon black and silica. The tensile strength and tensile elongation can be further improved by using filler which contains at least one member selected from the group consisting of carbon black and silica.

In the rubber composition of the present disclosure, it is preferable that the rubber comprises at least one member selected from the group consisting of fluororubber, nitrile rubber, hydrogenated nitrile rubber, and acrylic rubber. When the rubber comprises at least one member selected from the group consisting of fluororubber, nitrile rubber, hydrogenated nitrile rubber, and acrylic rubber, it is possible to favorably form the rubber composition.

Advantageous Effect

According to the present disclosure, it is possible to provide a rubber composition which contains fibrous carbon nanostructures and a filler and which is excellent in tensile strength and tensile elongation.

DETAILED DESCRIPTION

Hereinafter, the present disclosure will be described in detail based on an embodiment. [Rubber Composition]

A rubber composition of the present disclosure is a rubber composition which comprises a rubber, fibrous carbon nanostructures, and a filler. The rubber composition is characterized in that, in a state where the filler is dispersed in the rubber composition, the filler is mainly present as aggregates each formed of a plurality of primary particles aggregated with each other, and that the average maximum diameter of the aggregates is 100 nm or more and 1000 nm or less.

<Rubber>

The rubber is not particularly limited and known rubbers that can be used for rubber compositions as composite materials can be used.

Among rubbers, it is preferable to use at least one rubber selected from the group consisting of fluororubber, nitrile rubber, hydrogenated nitrile rubber, and acrylic rubber, and it is more preferable to use at least one rubber selected from the group consisting of fluororubber, nitrile rubber, and hydrogenated nitrile rubber. When at least one rubber selected from the group consisting of fluororubber, nitrile rubber, hydrogenated nitrile rubber, and acrylic rubber is used, it is possible to favorably form a rubber composition as a composite material.

<Fibrous Carbon Nanostructures>

The fibrous carbon nanostructures are not particularly limited.

Cylindrical carbon nanostructures such as carbon nanotubes (CNTs) and non-cylindrical carbon nanostructures such as those in which a network of six-membered ring network made of carbon is formed in a flat cylindrical shape can be used. Such fibrous carbon nanostructures can be used singly or in combination.

Among the foregoing fibrous carbon nanostructures, it is preferable to use fibrous carbon nanostructures including CNTs. When fibrous carbon nanostructures including CNTs are used, the physical properties of the rubber composition can be improved even when small amounts of the fibrous carbon nanostructures are added.

The fibrous carbon nanostructures including CNTs may consist solely of CNTs or may be a mixture of CNTs and fibrous carbon nanostructures other than CNTs.

Any type of CNTs can be included in the fibrous carbon nanostructures and single-walled carbon nanotubes and/or multi-walled carbon nanotubes can be used, with single- to up to 5-walled carbon nanotubes being preferred and single-walled carbon nanotubes being more preferred. The smaller the number of carbon nanotubes layers, the more physical properties of the rubber composition can be improved even when small amounts of carbon nanotubes are added.

The average diameter of the fibrous carbon nanostructures is preferably 1 nm or more, but preferably 60 nm or less, more preferably 30 nm or less, and still more preferably 10 nm or less. When the average diameter of the fibrous carbon nanostructures is 1 nm or more, it is possible to obtain a rubber composition in which the fibrous carbon nanostructures are favorably dispersed. When the average diameter of the fibrous carbon nanostructures is 60 nm or less, the physical properties of the rubber composition can be sufficiently improved even when small amounts of the fibrous carbon nanostructures are added.

As the fibrous carbon nanostructures, it is preferable to use fibrous carbon nanostructures in which the ratio $(3\sigma/Av)$ of the standard deviation ($\sigma$: sample standard deviation) of diameters to the average diameter (Av) multiplied by 3 ($3\sigma$) is greater than 0.20 and less than 0.60, more preferably to use fibrous carbon nanostructures in which $3\sigma/Av$ is greater than 0.25, and even more preferably to use fibrous carbon nanostructures in which $3\sigma/Av$ is greater than 0.40. Using fibrous carbon nanostructures with $3\sigma/Av$ greater than 0.20 and less than 0.60 can further improve the performance of the rubber composition produced.

The average diameter (Av) and standard deviation ($\sigma$) of the fibrous carbon nanostructures may be adjusted by changing the manufacturing method and the manufacturing condition of the fibrous carbon nanostructures, or by combining different types of fibrous carbon nanostructures obtained by different manufacturing methods.

As the fibrous carbon nanostructures, typically used are those whose plot of diameter frequency versus diameter measured as described above takes a normal distribution when approximated by Gaussian distribution.

The average length of the fibrous carbon nanostructures is preferably 10 μm or more, more preferably 50 μm or more, even more preferably 80 μm or more, but preferably 600 μm or less, more preferably 500 μm or less, and even more preferably 400 μm or less. When the average length is equal to or greater than the above-mentioned lower limit, the physical properties of the rubber composition can be sufficiently improved even when small amounts are added. When the average length is equal to or less than the upper limit, it is possible to obtain a rubber composition in which the fibrous carbon nanostructures are favorably dispersed.

The fibrous carbon nanostructures typically have an aspect ratio of greater than 10. The aspect ratio of the fibrous carbon nanostructures can be found by measuring the diameters and lengths of 100 randomly selected fibrous carbon nanostructures using a scanning electron microscope (SEM) or transmission electron microscope (TEM), and calculating the average of the ratios of length to diameter (length/diameter ratios).

The BET specific surface area of the fibrous carbon nanostructures is preferably 200 $m^2/g$ or more, more preferably 400 $m^2/g$ or more, even more preferably 600 $m^2/g$ or more, but preferably 2,000 $m^2/g$ or less, more preferably 1,800 $m^2/g$ or less, and even more preferably 1,600 $m^2/g$ or less. When the BET specific surface area of the fibrous carbon nanostructures is 200 $m^2/g$ or more, the physical properties of the rubber composition can be sufficiently enhanced even when small amounts are added. When the BET specific surface area of fibrous carbon nanostructures is 2,000 $m^2/g$ or less, it is possible to obtain a rubber composition in which the fibrous carbon nanostructures are favorably dispersed.

As used herein, "BET specific surface area" refers to a nitrogen adsorption specific surface area measured by the BET method.

The fibrous carbon nanostructures preferably exhibit a convex upward shape in a t-plot obtained from an adsorption isotherm. The t-plot can be obtained from the adsorption isotherm of the fibrous carbon nanostructures measured by the nitrogen gas adsorption method by converting the relative pressure to an average thickness t (nm) of an adsorbed layer of nitrogen gas. Specifically, an average adsorbed nitrogen gas layer thickness t corresponding to a given relative pressure is calculated from a known standard isotherm of average adsorbed nitrogen gas layer thickness t plotted against relative pressure P/P0 and the relative pressure is converted to the corresponding average adsorbed nitrogen gas layer thickness t to obtain a t-plot for the fibrous carbon nanostructures (t-plot method of de Boer et al.).

Here, in the case of a material having pores on its surface, the growth of the nitrogen gas adsorbing layer is classified into the following processes (1) to (3). By the processes (1) to (3) described below, a change occurs in the slope of the t-plot.

(1) a process in which a single molecular adsorption layer is formed over the entire surface by nitrogen molecules;

(2) a process in which a multi-molecular adsorption layer is formed in accompaniment to capillary condensation filling of pores; and (3) a process in which a multi-molecular adsorption layer is formed on a surface that appears to be non-porous due to the pores being filled by nitrogen.

A t-plot that exhibits a convex upward shape shows a straight line crossing the origin in a region in which the average adsorbed nitrogen gas layer thickness t is small, but, as t increases, the plot deviates downward from the straight line. Fibrous carbon nanostructures having such a t-plot shape indicate that the fibrous carbon nanostructures have a large internal specific surface area with respect to total specific surface area and that there are a large number of openings in the carbon nanostructures constituting the fibrous carbon nanostructures.

The t-plot for the fibrous carbon nanostructures preferably has a bending point in a range of $0.2 \leq t$ (nm)$\leq 1.5$, more preferably in a range of $0.45 \leq t$ (nm)$\leq 1.5$, and even more preferably in a range of $0.55 \leq t$ (nm)$\leq 1.0$. When the bending point of the t-plot of the fibrous carbon nanostructures falls within such a range, the physical properties of the rubber composition can be enhanced even when small amounts are added.

The "position of the bending point" is an intersection point of an approximate straight line A for process (1) and an approximate straight line B for process (3).

The fibrous carbon nanostructures preferably have a ratio of internal specific surface area S2 to total specific surface area S1 (S2/S1) of 0.05 or more and 0.30 or less, obtained from the t-plot. When the S2/S1 of the fibrous carbon nanostructures is within such a range, the physical properties of the rubber composition can be improved even when small amounts are added.

Total specific surface area S1 and internal specific surface area S2 of the fibrous carbon nanostructures can be found from the t-plot. Specifically, first, total specific surface area S1 can be found from the gradient of an approximate straight line corresponding to process (1) and external specific surface area S3 can be found from the gradient of an approximate straight line corresponding to process (3). Internal specific surface area S2 can then be calculated by subtracting external specific surface area S3 from total specific surface area S1.

Measurement of adsorption isotherm, preparation of a t-plot, and calculation of total specific surface area S1 and internal specific surface area S2 based on t-plot analysis for fibrous carbon nanostructures can be made using for example BELSORP®-mini (BELSORP is a registered trademark in Japan, other countries, or both), a commercially available measurement instrument available from Bel Japan Inc.

Furthermore, fibrous carbon nanostructures including CNTs, which are suitable as the fibrous carbon nanostructures, preferably exhibit a radial breathing mode (RBM) peak when evaluated by Raman spectroscopy. Note that no RBM appears in the Raman spectrum of fibrous carbon nanostructures composed solely of multi-walled carbon nanotubes having three or more walls.

In a Raman spectrum of the fibrous carbon nanostructures including CNTs, the ratio of G band peak intensity to D band peak intensity (G/D ratio) is preferably 0.5 or more and 5.0 or less. When the G/D ratio is 0.5 or more and 5.0 or less, the physical properties of the rubber composition can be further improved.

The fibrous carbon nanostructures including CNTs can be produced by any CNT synthesis method known in the art, e.g., arc discharge method, laser ablation method, or chemical vapor deposition (CVD) method. Specifically, the fibrous carbon nanostructures including CNTs can be efficiently produced for example in accordance with the super growth method (see WO2006/011655) wherein during synthesis of CNTs through chemical vapor deposition (CVD) by supplying a feedstock compound and a carrier gas onto a substrate having thereon a catalyst layer for carbon nanotube production, the catalytic activity of the catalyst layer is dramatically improved by providing a trace amount of an oxidizing agent (catalyst activating material) in the system. Hereinafter, carbon nanotubes obtained by the super growth method may also be referred to as "SGCNTs."

The fibrous carbon nanostructures produced by the super growth method may be composed only of SGCNTs, or may comprise, in addition to SGCNTs, other carbon nanostructures such as, for example, non-cylindrical carbon nanostructures.

The fibrous carbon nanostructures including single-walled CNTs produced by the super-growth method may be composed solely of SGCNTs, or of SGCNTs and non-cylindrical carbon nanostructures. Specifically, the fibrous carbon nanostructures including CNTs may include single- or multi-walled flattened cylindrical carbon nanostructures having over the entire length a "tape portion" where inner walls are in close proximity to each other or bonded together (hereinafter such carbon nanostructures are occasionally referred to as "graphene nanotapes (GNTs)").

The amount of the fibrous carbon nanostructures contained in the rubber composition of the present disclosure is preferably 0.1 parts by volume or more, more preferably 0.5 parts by volume or more, even more preferably 1 part by volume or more, and still even more preferably 1.4 parts by volume or more, but preferably 10 parts by volume or less, more preferably 8.5 parts by volume or less, even more preferably 7 parts by volume or less, and still even more preferably 5.3 parts by volume or less, per 100 parts by volume of the rubber. When the amount of the fibrous carbon nanostructures is not less than the above-mentioned lower limit, the electrical conductivity of the rubber composition and shaped article can be enhanced, so that the surface resistivity of the shaped article can be sufficiently lowered, and the mechanical strength of the shaped article can be sufficiently ensured. When the amount of the fibrous carbon nanostructures is not greater than the above upper limit, it is possible to reduce the unevenness in electrical conductivity of the shaped article. Therefore, when the amount of the fibrous carbon nanostructures is within the above-mentioned range, it is possible to allow the shaped article to exert sufficient antistatic performance while ensuring sufficient mechanical strength of the shaped article.

<Filler>

The filler is not particularly limited and known fillers that can be used for rubber compositions can be used.

Among such fillers, it is preferable to use at least one filler selected from the group consisting of carbon black and silica.

Carbon blacks that can be used as the filler are not particularly limited and known carbon blacks that can be used for rubber compositions can be used.

Specific examples of carbon blacks include SAF, ISAF, CF, SCF, EPC, MPC, HAF, FF, FEF, HMF, GPF, APF, SRF, MPF, FT, and MT. These carbon blacks may be used singly or in combination.

Silicas that can be used as the filler are not particularly limited and known types of silica that can be used for rubber compositions can be used.

Specific examples of silicas include colloidal silica, wet silica, amorphous silica, fumed silica, silica sol, and silica gel. These silicas may be used alone or in combination. The surface of silica may be modified with a functional group such as a hydrophilic or hydrophobic group.

The filler is usually manufactured and sold as a powder or granules having a particle diameter of about one to several millimeters. Particles of these powders and granules are aggregate clumps formed by further aggregation of aggregates of primary particles having a primary average particle diameter of the order of nanometers. These aggregate clumps are finely pulverized by being added to the rubber composition and dispersed, so that they are mainly dispersed in the rubber composition as aggregates each formed of a plurality of primary particles aggregated together.

In the rubber composition of the present disclosure, in a state where the filler is dispersed in the rubber composition, the filler is mainly present as aggregates each formed of a plurality of primary particles aggregated with each other, and the average maximum diameter of the aggregates is 100 nm or more and 1,000 nm or less. The average maximum diameter of the aggregates is preferably 120 nm or more, more preferably 150 nm or more, even more preferably 180 nm or more, and still even more preferably 220 nm or more, but preferably 800 nm or less, more preferably 700 nm or less, and even more preferably 650 nm or less. When the average maximum diameter of the aggregates is not less than the above-mentioned lower limit, the tensile strength and tensile elongation of the rubber composition and shaped article can be sufficiently ensured. When the average maximum diameter of the aggregates is not greater than the above upper limit, the aggregates can be favorably dispersed in the rubber composition, so that the tensile strength and tensile elongation of the rubber composition and shaped article can be sufficiently improved.

In the present disclosure, the "average maximum diameter of aggregates" of the filler can be found by measuring the maximum diameters of 10 or more arbitrarily selected filler aggregates on a transmission electron microscope image and calculating the numerical average of the maximum diameters.

When the rubber composition of the present disclosure is observed by transmission electron microscopy (TEM), only particles of filler (such as aggregates and primary particles) can be observed and no fibrous carbon nanostructures and other additives are observed. Thus, only particles of the filler can be clearly identified for observation.

As used herein, the phrase "mainly present as aggregates" means that the proportion of primary particles is less than 20% among 100 or more arbitrarily selected filler particles in the rubber composition on a transmission electron microscope (TEM) image. The proportion of primary particles among the filler particles in the rubber composition is preferably less than 10%, and more preferably less than 5%. When the proportion of primary particles is less than 20%, the tensile strength of the rubber composition and shaped article can be sufficiently ensured.

The primary particle diameter of the filler is not particularly limited, but is preferably 10 nm or more, more preferably 10 nm or more, and even more preferably 15 nm or more, but preferably 500 nm or less, more preferably 400 nm or less, and even more preferably 300 nm or less. When the primary particle diameter falls within this range, the filler can be favorably dispersed in the rubber composition as aggregates having an average maximum diameter of 100 nm or more and 1,000 nm or less.

As used herein the term "primary particle diameter" refers to the average particle diameter of primary particles as measured by transmission electron microscopy.

The amount of the filler contained in the rubber composition of the present disclosure is not particularly limited, but is preferably 1 part by volume or more, more preferably 5 parts by volume or more, and even more preferably 8 parts by volume or more, but preferably 100 parts by volume or less, more preferably 90 parts by volume or less, and even more preferably 80 parts by volume or less, per 100 parts by volume of the rubber. When the amount of the filler falls within the above range, a reinforcing effect in the rubber composition and shaped article can be sufficiently exhibited, so that tensile strength and tensile elongation can be improved.

<Additives>

Additives that can be optionally blended into the rubber composition are not particularly limited, and known additives such as cross-linkers, cross-linking aids, co-cross-linkers, lubricants, antioxidants, and coupling agents can be used.

Specifically, cross-linkers are not particularly limited, and known cross-linkers capable of crosslinking the rubber contained in the rubber composition can be used. More specifically, sulfur-based vulcanizing agents, peroxide-based cross-linkers, polyol-based cross-linkers, polyamine-based cross-linkers and other cross-linkers can be used.

Further, cross-linking aids are not particularly limited, and zinc white or the like can be used.

Co-cross-linkers are not particularly limited, and for example, triallyl isocyanurate, 2,5-dimethyl-2,5-di(t-butylperoxy)hexane or the like can be used.

Lubricants are not particularly limited, and stearic acid or the like can be used.

Antioxidants are not particularly limited and examples include N-phenyl-N'-isopropyl-p-phenylenediamine, 2,2,4-trimethyl-1,2-dihydroquinoline polymer, 4,4'-bis(α,α-dimethylbenzyl)diphenylamine, 2-mercaptobenzimidazole zinc salt, di-t-butyl-P-cresol, pentaerythrityl-tetraxy[3-(3,5-di-t-butyl-4-hydroxyphenyl)propionate], 2,2' methylenebis(2-methyl-6-t-butylphenyl), bis(2,2,6,6-tetramethyl-4-piperazyl)sebacate, N,N'-hexane-1,6-diylbis[3-(3,5-di-tert-butyl-4-hydroxyphenyl)propionamide], and bis(2,2,6,6-tetramethyl-4-piperazyl)sebacate.

Coupling agents are not particularly limited and examples include γ-chloropropyltrimethoxysilane, vinyltriethoxysilane, vinyl-tris-(β-methoxyethoxy)silane, γ-methacryloxypropyltrimethoxysilane, β-(3,4-ethoxycyclohexyl)ethyltrimethoxysilane, γ-glycidoxypropyltrimethoxysilane, γ-mercaptopropyltrimethoxysilane, γ-aminopropyltrimethoxysilane, and N-β-(aminoethyl)-γ-aminopropyltrimethoxysilane.

These additives may be used singly or two or more of such additives may be used in combination. Any amounts of additives may be added as long as exertion of desired effects is not compromised.

(Method of Producing Rubber Composition)

The rubber composition can be produced for example by mixing or kneading the rubber, fibrous carbon nanostructures, filler, and optional additives in desired ratios.

The mixing or kneading method and the order of mixing or kneading are not particularly limited. From the viewpoint of suitably dispersing the fibrous carbon nanostructures, it is preferable to first obtain a mixture of rubber and fibrous carbon nanostructures and then knead the obtained mixture with the filler and/or additives.

<Mixing/Dispersing Step>

Preparation of a mixture of rubber and fibrous carbon nanostructures can be performed using any mixing method capable of dispersing the fibrous carbon nanostructures in the rubber.

For example, a dispersed liquid is obtained by adding the fibrous carbon nanostructures into a rubber dispersion liquid obtained by dissolving or dispersing the rubber in a dispersion medium such as an organic solvent, and performing known dispersing treatment. Alternatively, a dispersed liquid can be obtained by adding fibrous carbon nanostructures into an organic solvent or dispersion medium capable of dissolving or dispersing the rubber, performing dispersing treatment, and adding a rubber into the obtained fibrous carbon nanostructure dispersion liquid so as to dissolve or dissolve the rubber therein.

From the dispersed liquid thus obtained, the organic solvent or dispersion medium is removed by known methods to prepare a mixture of rubber and fibrous carbon nanostructures.

The dispersing treatment can be performed using known dispersing methods. Such dispersing methods are not particularly limited, and examples include an ultrasonic homogenizer, a wet jet mill, and a high-speed rotary shear disperser, with a wet jet mill being preferable. This is because by applying a suitably strong shear force, the fibrous carbon nanostructures can be sufficiently dispersed, whereby a rubber composition and a shaped article with improved material homogeneity can be formed. The pressure applied for dispersing the mixture solution by means of a wet jet mill may be 10 to 180 MPa, preferably 15 to 170 MPa, more preferably 20 to 160 MPa, and even more preferably 20 to 150 MPa. The number of treatments (passes) to be performed is 1 or more, and preferably 2 to 20. The temperature of the dispersing treatment is preferably 0° C. to 80° C. Examples of wet jet mills that can be used in the dispersing treatment include NanoVater® (NanoVater is a registered trademark in Japan, other countries, or both) manufactured by Yoshida Kikai Co., Ltd., BERYU SYSTEM PRO manufactured by Beryu Corporation, an ultra high-pressure wet micronizer manufactured by Yoshida Kogyo Co., Ltd., NANOMIZER® (NANOMIZER is a registered trademark in Japan, other countries, or both) manufactured by NANOMIZER Inc., and Star Burst® (Star Burst is a registered trademark in Japan, other countries, or both), manufactured by Sugino Machine Limited. The minimum flow path diameter of the wet jet mill is preferably 100 μm or more from the viewpoint of prevention of clogging, and is preferably 1,000 μm or less, more preferably 500 μm or less, and even more preferably 300 μm or less from the viewpoint of effective dispersing under pressure.

The mixture of rubber and fibrous carbon nanostructures can be prepared by removing the dispersion medium such as organic solvent from the resulting dispersed liquid. Removal of dispersion media such as organic solvent can be accomplished for example by solidification methods, casting methods, or drying methods. From the viewpoint of efficiently removing dispersion media while ensuring the dispersibility of the fibrous carbon nanostructures, it is preferable to directly dry the dispersed liquid.

As the drying methods, spray drying, vacuum drying, drying by circulation of inert gas, and other known drying methods can be used.

<Kneading Step>

The rubber composition of the present disclosure can be obtained by further blending and kneading the filler, optional additives and the like into the mixture of rubber and fibrous carbon nanostructures obtained as described above. Kneading of the mixture with the filler and/or additives can be accomplished using any known kneading devices such as, for example, a mixer, a single screw kneader, a twin screw kneader, a roll, Brabender® (Brabender is a registered trademark in Japan, other countries, or both), or an extruder.

The kneading conditions used in the kneading step are not particularly limited, and kneading conditions normally used for kneading rubber compositions can be used as appropriate.

By adjusting the kneading conditions according to, for example, the viscosity of the mixture of rubber and fibrous carbon nanostructures, the physical properties of the filler and/or optional additives, and/or the amounts of the added filler and/or optional additives, it is possible to allow the filler to be dispersed in the rubber composition such that the filler is mainly present as aggregates having an average maximum diameter of 100 nm or more and 1,000 nm or less.

EXAMPLES

The following provides a more specific description of the present disclosure based on Examples, which however shall not be construed as limiting. In the following description, "%" and "parts" used to express quantities are by mass, unless otherwise specified.

In Examples and Comparative Examples, the average maximum diameter of filler aggregates and tensile strength and tensile elongation were measured or evaluated using the methods described below.

<Average Maximum Diameter of Aggregates>

From the cross-linked rubber sheets obtained in Examples and Comparative Examples, frozen thin films having a thickness of 100±10 nm were cut using a cryomicrotome (Leica EM FC7, manufactured by JEOL Ltd.). Each thin film as a measurement sample was observed for aggregates by TEM (HT7700, manufactured by Hitachi High-Technologies Corporation). From the obtained TEM image, 10 or more aggregates were arbitrarily selected and measured for their maximum diameter and the average value of the measured maximum diameters was recorded as the average maximum diameter of the aggregates. Table 1 shows the results.

<Tensile Strength TS, Tensile Elongation $E_b$>

The cross-linked rubber sheets obtained in Examples and Comparative Examples were punched into dumbbell test pieces (JIS #3 dumbbell) to prepare test pieces. For each test piece, tensile test was performed using a tensile test machine (STROGRAPH VG, manufactured by Toyo Seiki Seisaku-sho, Ltd.) at test temperature of 23° C., 50% test humidity and 500±50 mm/min tensile rate in accordance with JIS K6251:2010 to measure tensile strength TS (maximum tensile force recorded when the test piece was pulled until break divided by the initial cross-sectional area of the test piece) and $E_b$ (elongation at break of test piece, expressed in percentage of the initial state).

The measured tensile strength TS and tensile elongation $E_b$ were indexed on the basis of the rubber composition of Comparative Example as 100, which has the same formulation except for the absence of filler. The results are shown in Table 1.

The higher the index value, the better the tensile strength TS and tensile elongation $E_b$, indicating superior mechanical properties.

Example 1-1

To 95 kg of methyl ethyl ketone (MEK) as organic solvent was charged 5.0 kg of fluororubber (FKM; Viton GBL600S, manufactured by DuPont) and dissolved by stirring at 20° C. for 8 hours or more using a stirrer to prepare a fluororubber solution. To this fluororubber solution was added 200 g of carbon nanotubes (ZEONANO SG101, single-walled CNTs, specific gravity: 1.7, average diameter: 3.5 nm, average length: 400 μm, BET specific surface area: 1,050 m$^2$/g, G/D ratio: 2.1, t-plot: convex upward shape (position of bending point: 0.6 nm), internal specific surface area S2/total specific surface area S1:0.24, manufactured by Zeon Nanotechnology Co., Ltd.) as fibrous carbon nanostructures, and stirred for 10 minutes with a stirrer.

The crude dispersion liquid was then dispersed 5 times using a high-pressure dispersing device (BERYU SYSTEM PRO, manufactured by Beryu Corporation) at a pressure of 100 MPa and a temperature of 20° C. to afford a dispersed liquid. The resulting dispersed liquid was then added dropwise to 400 Kg of water and coagulated to afford black solids. The obtained black solids were dried under reduced pressure at 80° C. for 12 hours to afford a mixture of fluororubber and CNTs (100 parts by mass (100 parts by volume) of fluororubber, and 4 parts by mass (5.3 parts by volume) of CNTs).

Thereafter, 104 parts by mass (105.3 parts by volume) of the mixture of fluororubber and CNTs, 10 parts by mass (10.2 parts by volume) of carbon black MT (Thermax® MT, manufactured by Cancarb) as a filler, 3 parts by mass of zinc oxide (JIS Grade 2 zinc white) as a cross-linking aid, 3 parts by mass of triallyl isocyanurate (TAIC® (TAIC is a registered trademark in Japan, other countries, or both), manufactured by Nippon Kasei Chemical Company Limited) as a co-cross-linker, and 2 parts by mass of 2,5-dimethyl-2,5-di(t-butylperoxy)hexane (PERHEXA® 25B40 (PERHEXA is a registered trademark in Japan, other countries, or both), manufactured by NOF Corporation) as a cross-linker were kneaded to afford a rubber composition.

The obtained rubber composition was cross-linked (primary cross-linking) at 160° C. and 10 MPa for 15 minutes to afford a sheet-shaped cross-linked product having a thickness of 2 mm. The resulting sheet-like cross-linked product was then cross-linked at 230° C. for 2 hours (secondary cross-linking) to afford a cross-linked rubber sheet.

Example 1-2

A cross-linked rubber sheet was obtained as in Example 1-1 except that carbon black FEF (SEAST 50, manufactured by Tokai Carbon Co., Ltd.) was used as a filler.

Example 1-3

A cross-linked rubber sheet was obtained as in Example 1-1 except that carbon black FT (Asahi #50, manufactured by Asahi Carbon Co., Ltd.) was used as a filler.

Example 1-4

A cross-linked rubber sheet was obtained as in Example 1-1 except that carbon black HAF (SEAST 3, manufactured by Tokai Carbon Co., Ltd.) was used as a filler.

Example 1-5

A cross-linked rubber sheet was obtained as in Example 1-1 except that hydrophobic silica (AEROSIL® R972V (AEROSIL is a registered trademark in Japan, other countries, or both), manufactured by Evonik Industries AG) was used as a filler.

Comparative Example 1-1

A cross-linked rubber sheet was obtained as in Example 1-1 except that no filler was added.

Comparative Example 1-2

As a filler, carbon black FEF (SEAST SO, manufactured by Tokai Carbon Co., Ltd.) was used, and using an open roll mixer having a temperature of 20° C., 104 parts by mass (105.3 parts by volume) of a mixture of fluororubber and CNTs, 3 parts by mass of zinc oxide (JIS Grade 2 zinc white) as a cross-linking aid, 3 parts by mass of triallyl isocyanurate (TAIC®, manufactured by Nippon Kasei Chemical Company Limited) as a co-cross-linker, and 2 parts by mass of 2,5-dimethyl-2,5-di(t-butylperoxy)hexane (PERHEXA 25B40, manufactured by NOF Corporation) as a cross-linker were mixed. A cross-linked rubber sheet was then obtained as in Example 1-1 except that using an open roll mixer adjusted to have a temperature of 50° C. and a roll interval of 2 mm, 10 parts by mass (10.2 parts by volume) of carbon black FEF (SEAST SO, manufactured by Tokai Carbon Co., Ltd.) as a filler was mixed to afford a rubber composition.

Comparative Example 1-3

A cross-linked rubber sheet was obtained as in Example 1-1 except that carbon black FEF (SEAST SO, manufactured by Tokai Carbon Co., Ltd.) was used as a filler and the kneading time was 10 times longer.

Example 2-1

A cross-linked rubber sheet was obtained as in Example 1-1 except that the amount of the fibrous carbon nanostructures in the rubber composition was changed to 3 parts by mass (3.9 parts by volume).

Example 2-2

A cross-linked rubber sheet was obtained as in Example 2-1 except that the amount of carbon black MT added as a filler was doubled to 20 parts by mass (20.4 parts by volume).

Comparative Example 2

A cross-linked rubber sheet was obtained as in Example 2-1 except that no filler was added.

Example 3

A cross-linked rubber sheet was obtained as in Example 1-1 except that the amount of the fibrous carbon nanostructures in the rubber composition was changed to 2 parts by mass (2.6 parts by volume) and hydrophilic silica (Nipsil® ER (Nipsil is a registered trademark in Japan, other countries, or both), manufactured by Tosoh Silica Corporation) was used as a filler.

Comparative Example 3

A cross-linked rubber sheet was obtained as in Example 3 except that no filler was added.

Example 4

To 195 kg of methyl ethyl ketone (MEK) as organic solvent was added 500 g of carbon nanotubes (ZEONANO SG101, single-walled CNTs, specific gravity: 1.7, average diameter: 3.5 nm, average length: 400 BET specific surface area: 1,050 $m^2/g$, G/D ratio: 2.1, t-plot: convex upward shape (position of bending point: 0.6 nm), internal specific surface area S2/total specific surface area S1:0.24, manufactured by Zeon Nanotechnology Co., Ltd.) as fibrous carbon nanostructures and stirred for 10 minutes with a stirrer.

The crude dispersion liquid was then dispersed 5 times using a high-pressure dispersing device (BERYU SYSTEM PRO, manufactured by Beryu Corporation) at a pressure of 100 MPa and a temperature of 20° C. to afford a CNT dispersion liquid having a concentration of 0.25% by mass.

To the obtained CNT dispersion liquid was added 5 kg of acrylonitrile-butadiene rubber (NBR; NIPOL® DN3350, manufactured by Zeon Corporation) and stirred and for dissolution at 20° C. for 8 hours using a stirrer. The resulting solution was then added dropwise to 800 kg of water and coagulated to afford black solids. The obtained black solids were dried under reduced pressure at 80° C. for 12 hours to afford a mixture of nitrile rubber and CNTs (100 parts by mass (100 parts by volume) of nitrile rubber and 10 parts by mass (7 parts by volume) of CNTs).

Thereafter, using an open roll mixer having a temperature of 20° C., 33 parts by mass (32.1 parts by volume, including 2.1 parts by volume of CNTs) of the mixture of nitrile rubber and CNTs, 70 parts by mass (70 parts by volume) of acrylonitrile-butadiene rubber (NIPOL DN3350, manufactured by Zeon Corporation), 20 parts by mass (10.9 parts by volume) of hydrophobic silica (AEROSIL® R972V, manufactured by Evonik Industries AG), 5 parts by mass of zinc oxide (JIS Grade 2 zinc white) as a cross-linking aid, 1 part by mass of stearic acid, 2 parts by mass of N-phenyl-N'-isopropyl-p-phenylenediamine (NOCRAC 810NA, manufactured by Ouchi Shinko Chemical Industrial Co., Ltd.) as a first antioxidant, 2 parts by mass of 2,2,4-trimethyl-dihydroquinopolymer (NOCRAC 224, manufactured by Ouchi Shinko Chemical Industrial Co., Ltd.) as a second antioxidant, 0.3 parts by mass of sulfur (S #325) as a vulcanizing agent, 1 part by mass of tetramethylthiuram disulfide (NOCCELER-TT, manufactured by Ouchi Shinko Chemical Industrial Co., Ltd.) as a first vulcanization accelerator, and N-cyclohexyl-2-benzothiazolyl sulfenamide (NOCCELER CZG, manufactured by Ouchi Shinko Chemical Industrial Co., Ltd.) as a second vulcanization accelerator were kneaded to afford a rubber composition. The obtained rubber composition was vulcanized at 160° C. for 10 minutes to afford a cross-linked rubber sheet having a thickness of 2 mm.

Comparative Example 4

A cross-linked rubber sheet was obtained as in Example 4 except that no filler was added.

Example 5

To 195 kg of methyl ethyl ketone (MEK) as organic solvent was added 500 g of carbon nanotubes (ZEONANO SG101, single-walled CNTs, specific gravity: 1.7, average diameter: 3.5 nm, average length: 400 BET specific surface area: 1,050 $m^2/g$, G/D ratio: 2.1, t-plot: convex upward shape (position of bending point: 0.6 nm), internal specific surface area S2/total specific surface area S1:0.24, manufactured by Zeon Nanotechnology Co., Ltd.) as fibrous carbon nanostructures and stirred for 10 minutes with a stirrer.

The crude dispersion liquid was then dispersed 5 times using a high-pressure dispersing device (BERYU SYSTEM PRO, manufactured by Beryu Corporation) at a pressure of 100 MPa and a temperature of 20° C. to afford a CNT dispersion liquid having a concentration of 0.25% by mass.

To the obtained CNT dispersion liquid was added 5 kg of hydrogenated acrylonitrile-butadiene rubber (HNBR; Zetpol® 2020, manufactured by; Zeon Corporation) and stirred for dissolution at 20° C. for 8 hours using a stirrer. The resulting solution was then added dropwise to 800 kg of water and coagulated to give black solids. The obtained black solids were dried under reduced pressure at 80° C. for 12 hours to afford a mixture of hydrogenated nitrile a rubber and CNTs (100 parts by mass (100 parts by volume) of hydrogenated nitrile rubber and 10 parts by mass (7 parts by volume) of CNTs).

Thereafter, using an open roll mixer having a temperature of 20° C., 22 parts by mass (21.4 parts by volume, including 1.4 parts by volume of CNTs) of the mixture of hydrogenated acrylonitrile rubber and CNTs, 80 parts by mass (80 parts by volume) of hydrogenated acrylonitrile-butadiene rubber (Zetpol 2020, manufactured by; Zeon Corporation), 15 parts by mass (8.2 parts by volume) of carbon black FEF (SEAST SO, manufactured by Tokai Carbon Co., Ltd.) as a filler, 5 parts by mass of zinc oxide (JIS Grade 2 zinc white) as a cross-linking aid, 1 part by mass of stearic acid, 1.5 parts by mass of 4,4'-bis(α,α-dimethylbenzyl)diphenylamine (manufactured by Ouchi Shinko Chemical Industrial Co., Ltd.)) as a first antioxidant, 1.5 parts by mass of 2-mercaptobenzimidazole zinc salt ("NOCRAC MBZ" manufactured by Ouchi Shinko Chemical Industrial Co., Ltd.) as a second antioxidant, and 8 parts by mass of 1,3-bis[1-(tert-butyl)peroxy)-1-methylethyl]benzene (VulCup®40KE (VulCup is a registered trademark in Japan, other countries, or both)) as a vulcanizing agent were kneaded to afford a rubber composition.

The obtained rubber composition was subjected to primary vulcanization (170° C., 20 minutes) and secondary vulcanization (150° C., 4 hours) to afford a cross-linked rubber sheet having a thickness of 2 mm.

Comparative Example 5

A cross-linked rubber sheet was obtained as in Example 5 except that no filler was added.

Example 6

A cross-linked rubber sheet was obtained as in Example 5 except that the amount of the fibrous carbon nanostructures in the rubber composition was increased to 5 parts by mass (3.5 parts by volume), which is 2.5 times the amount used in Example 5.

Comparative Example 6

A cross-linked rubber sheet was obtained as in Example 6 except that no filler was added.

TABLE 1

| | | | Ex. 1-1 | Ex. 1-2 | Ex. 1-3 | Ex. 1-4 | Ex. 1-5 | Comp. Ex. 1-1 | Comp. Ex. 1-2 |
|---|---|---|---|---|---|---|---|---|---|
| Formulation | Rubber | Type | FKM | FKM | FKM | FKM | FKM | FKM | FKM |
| | | Amount added [parts by vol.] | 100 | 100 | 100 | 100 | 100 | 100 | 100 |
| | CNT | Amount added [parts by vol.] | 5.3 | 5.3 | 5.3 | 5.3 | 5.3 | 5.3 | 5.3 |
| | Carbon black | Type | MT | FEF | FT | HAF | — | — | FEF |
| | | Primary particle diameter [nm] | 280 | 43 | 80 | 28 | — | — | 43 |
| | | Aggregate average maximum diameter [nm] | 434 | 350 | 221 | 153 | — | — | 1070 |
| | | Amount added [parts by vol.] | 10.2 | 10.2 | 10.2 | 10.2 | — | — | 10.2 |
| | Silica | Type | — | — | — | — | AEROSIL R972V | — | — |
| | | Primary particle diameter [nm] | — | — | — | — | 16 | — | — |
| | | Aggregate average maximum diameter [nm] | — | — | — | — | 123 | — | — |
| | | Amount added [parts by vol.] | — | — | — | — | 10.2 | — | — |
| Evaluation | Tensile strength TS | | 125 | 113 | 107 | 108 | 129 | 100 | 89 |
| | Tensile elongation $E_b$ | | 126 | 153 | 161 | 147 | 145 | 100 | 70 |

| | | | Comp. Ex. 1-3 | Ex. 2-1 | Ex. 2-2 | Comp. Ex. 2 | Ex. 3 | Comp. Ex. 3 | Ex. 4 |
|---|---|---|---|---|---|---|---|---|---|
| Formulation | Rubber | Type | FKM | FKM | FKM | FKM | FKM | FKM | NBR |
| | | Amount added [parts by vol.] | 100 | 100 | 100 | 100 | 100 | 100 | 100 |
| | CNT | Amount added [parts by vol.] | 5.3 | 3.9 | 3.9 | 3.9 | 2.6 | 2.6 | 2.1 |
| | Carbon black | Type | FEF | MT | MT | — | — | — | — |
| | | Primary particle diameter [nm] | 43 | 280 | 280 | — | — | — | — |
| | | Aggregate average maximum diameter [nm] | 50 | 434 | 434 | — | — | — | — |
| | | Amount added [parts by vol.] | 10.2 | 10.2 | 20.4 | — | — | — | — |
| | Silica | Type | — | — | — | — | Nipsil ER | — | AEROSIL R972V |
| | | Primary particle diameter [nm] | — | — | — | — | 15 | — | 16 |
| | | Aggregate average maximum diameter [nm] | — | — | — | — | 185 | — | 163 |
| | | Amount added [parts by vol.] | — | — | — | — | 10.2 | — | 10.9 |
| Evaluation | Tensile strength TS | | 95 | 107 | 115 | 100 | 139 | 100 | 111 |
| | Tensile elongation $E_b$ | | 120 | 109 | 101 | 100 | 103 | 100 | 190 |

| | | | | Comp. Ex. 4 | Ex. 5 | Comp. Ex. 5 | Ex. 6 | Comp. Ex. 6 |
|---|---|---|---|---|---|---|---|---|
| Formulation | Rubber | Type | | NBR | HNBR | HNBR | HNBR | HNBR |
| | | Amount added [parts by vol.] | | 100 | 100 | 100 | 100 | 100 |
| | CNT | Amount added [parts by vol.] | | 2.1 | 1.4 | 1.4 | 3.5 | 3.5 |
| | Carbon black | Type | | — | FEF | — | FEF | — |
| | | Primary particle diameter [nm] | | — | 43 | — | 43 | — |
| | | Aggregate average maximum diameter [nm] | | — | 271 | — | 271 | — |
| | | Amount added [parts by vol.] | | — | 8.2 | — | 8.2 | — |
| | Silica | Type | | — | — | — | — | — |
| | | Primary particle diameter [nm] | | — | — | — | — | — |

TABLE 1-continued

|  |  |  |  |  |  |  |  |
|---|---|---|---|---|---|---|---|
|  | Aggregate average maximum diameter [nm] | — | — | — | — | — |  |
|  | Amount added [parts by vol.] | — | — | — | — | — |  |
| Evaluation | Tensile strength TS | 100 | 164 | 100 | 126 | 100 |  |
|  | Tensile elongation $E_b$ | 100 | 115 | 100 | 117 | 100 |  |

It can be seen from Table 1 that the rubber compositions of Examples in which the filler is present as aggregates and the average maximum diameter of the aggregates is 100 nm or more and 1,000 nm or less showed significantly improved tensile strength and tensile elongation compared to the rubber compositions of Comparative Examples in which the filler is not added or the average maximum diameter of filler aggregates is less than 100 nm or more than 1,000 nm.

INDUSTRIAL APPLICABILITY

According to the present disclosure, it is possible to provide a rubber composition as a composite excellent in tensile strength and tensile elongation.

The invention claimed is:

1. A rubber composition comprising a rubber, fibrous carbon nanostructures, and a filler,
   wherein, in a state where the filler is dispersed in the rubber composition, the filler is mainly present as aggregates each formed of a plurality of primary particles aggregated with each other,
   the aggregates have an average maximum diameter of 100 nm or more and 1,000 nm or less, and
   the filler comprises silica.

2. The rubber composition of claim 1, wherein the fibrous carbon nanostructures are contained in an amount of 0.1 parts by volume or more and 10 parts by volume or less per 100 parts by volume of the rubber.

3. The rubber composition of claim 1, wherein the filler is contained in an amount of 1 part by volume or more and 100 parts by volume or less per 100 parts by volume of the rubber.

4. The rubber composition of claim 1, wherein the fibrous carbon nanostructures comprise single-walled carbon nanotubes.

5. The rubber composition of claim 1, wherein a t-plot obtained from an adsorption isotherm of the fibrous carbon nanostructures exhibits a convex upward shape.

6. The rubber composition of claim 5, wherein a bending point of the t-plot is present in a range of $0.2 \leq t \text{ (nm)} \leq 1.5$.

7. The rubber composition of claim 5, wherein total specific surface area S1 and internal specific surface area S2 obtained from the t-plot satisfy $0.05 \leq S2/S1 \leq 0.30$.

8. The rubber composition of claim 1, wherein the rubber comprises at least one member selected from the group consisting of a fluororubber, a nitrile rubber, a hydrogenated nitrile rubber, and an acrylic rubber.

* * * * *